United States Patent
Hirata et al.

(10) Patent No.: US 8,320,640 B2
(45) Date of Patent: Nov. 27, 2012

(54) BIOMETRICS AUTHENTICATION METHOD AND CLIENT TERMINAL AND AUTHENTICATION SERVER USED FOR BIOMETRICS AUTHENTICATION

(75) Inventors: Shinji Hirata, Yokohama (JP); Kenta Takahashi, Kamakura (JP)

(73) Assignee: Hitachi, Ltd., Tokyo (JP)

( * ) Notice: Subject to any disclaimer, the term of this patent is extended or adjusted under 35 U.S.C. 154(b) by 300 days.

(21) Appl. No.: 12/760,921

(22) Filed: Apr. 15, 2010

(65) Prior Publication Data

US 2010/0315201 A1 Dec. 16, 2010

(30) Foreign Application Priority Data

Jun. 10, 2009 (JP) .................................. 2009-138778

(51) Int. Cl.
*G06K 9/00* (2006.01)
*G05B 19/00* (2006.01)
(52) U.S. Cl. ...................................... 382/115; 340/5.82
(58) Field of Classification Search .................. 382/115, 382/116, 124, 125, 218, 128, 224–228, 305; 340/5.82, 5.83; 713/186, 168, 182; 715/716; 726/5, 1, 19
See application file for complete search history.

(56) References Cited

U.S. PATENT DOCUMENTS

| | | | | |
|---|---|---|---|---|
| 5,841,888 A * | 11/1998 | Setlak et al. | ................... | 382/124 |
| 5,845,005 A * | 12/1998 | Setlak et al. | ................... | 382/124 |
| 5,892,838 A * | 4/1999 | Brady | ........................... | 382/115 |
| 6,118,890 A * | 9/2000 | Senior | ........................... | 382/125 |
| 6,181,807 B1 * | 1/2001 | Setlak et al. | ................... | 382/124 |
| 6,661,908 B1 * | 12/2003 | Suchard et al. | ............... | 382/119 |
| 6,941,003 B2 * | 9/2005 | Ziesig | ........................... | 382/124 |
| 6,954,553 B2 * | 10/2005 | Ikegami | ........................ | 382/224 |
| 6,985,583 B1 * | 1/2006 | Brainard et al. | ................ | 380/44 |
| 7,046,829 B2 * | 5/2006 | Udupa et al. | ................... | 382/124 |
| 7,278,028 B1 * | 10/2007 | Hingoranee | .................. | 713/186 |

(Continued)

FOREIGN PATENT DOCUMENTS

JP 2007-293807 A 11/2007

OTHER PUBLICATIONS

Xuejun Tan; Bir Bhanu; YingQiang Lin; "Fingerprint identification: classification vs. indexing", Proceedings. IEEE Conference on Advanced Video and Signal Based Surveillance, 2003. pp. 151-156.*

(Continued)

*Primary Examiner* — Wenpeng Chen
*Assistant Examiner* — Feng Niu
(74) *Attorney, Agent, or Firm* — Foley & Lardner LLP (57) ABSTRACT

In a biometrics authentication system inputting biometric information and outputting a user ID, speedup of 1:N matching on the side of server is achieved when cancelable biometrics authentication is realized in which matching is carried out. During registration, similarity of a feature to a dummy feature is searched and the feature is transformed by using a transform parameter corresponding to a nearest neighboring dummy feature. The transformed feature and a group ID are transmitted to the server and the server registers the transformed feature at the group in a DB. During authentication, like the registration process, similarity search of a feature is carried out and the feature is transformed by using transform parameter corresponding to a nearest neighboring dummy feature. The transformed feature and group ID are transmitted to the server. The server executes 1:1 matching between a template a the group in the DB and the transformed feature.

6 Claims, 5 Drawing Sheets

U.S. PATENT DOCUMENTS

| | | | |
|---|---|---|---|
| 7,330,572 B2* | 2/2008 | Uchida | 382/124 |
| 7,502,467 B2* | 3/2009 | Brainard et al. | 380/44 |
| 7,512,255 B2* | 3/2009 | Kakadiaris et al. | 382/118 |
| 7,580,551 B1* | 8/2009 | Srihari et al. | 382/115 |
| 7,773,784 B2* | 8/2010 | Boult | 382/124 |
| 8,031,981 B2* | 10/2011 | Peirce | 382/305 |
| 2002/0118864 A1* | 8/2002 | Kondo et al. | 382/117 |
| 2002/0152034 A1* | 10/2002 | Kondo et al. | 702/19 |
| 2003/0039380 A1* | 2/2003 | Sukegawa et al. | 382/118 |
| 2003/0103652 A1* | 6/2003 | Lee et al. | 382/118 |
| 2004/0062423 A1* | 4/2004 | Doi | 382/118 |
| 2004/0230810 A1* | 11/2004 | Hillhouse | 713/186 |
| 2004/0255168 A1* | 12/2004 | Murashita et al. | 713/202 |
| 2005/0008200 A1* | 1/2005 | Azuma et al. | 382/117 |
| 2005/0152583 A1* | 7/2005 | Kondo et al. | 382/117 |
| 2005/0238214 A1* | 10/2005 | Matsuda et al. | 382/124 |
| 2005/0249385 A1* | 11/2005 | Kondo et al. | 382/117 |
| 2006/0021003 A1* | 1/2006 | Fisher et al. | 726/1 |
| 2006/0158307 A1* | 7/2006 | Lee et al. | 340/5.53 |
| 2006/0204058 A1* | 9/2006 | Kim et al. | 382/118 |
| 2006/0210126 A1* | 9/2006 | Cho | 382/124 |
| 2007/0003112 A1* | 1/2007 | Awatsu et al. | 382/117 |
| 2007/0031010 A1* | 2/2007 | Sukegawa et al. | 382/118 |
| 2007/0036400 A1* | 2/2007 | Watanabe et al. | 382/124 |
| 2007/0061590 A1* | 3/2007 | Boye et al. | 713/186 |
| 2007/0118758 A1* | 5/2007 | Takahashi et al. | 713/186 |
| 2007/0253624 A1* | 11/2007 | Becker | 382/225 |
| 2007/0276853 A1* | 11/2007 | Hamza | 707/101 |
| 2007/0286465 A1* | 12/2007 | Takahashi et al. | 382/125 |
| 2008/0013803 A1* | 1/2008 | Lo et al. | 382/124 |
| 2008/0037833 A1* | 2/2008 | Takahashi et al. | 382/115 |
| 2008/0065900 A1* | 3/2008 | Lee et al. | 713/186 |
| 2008/0072063 A1* | 3/2008 | Takahashi et al. | 713/186 |
| 2008/0101658 A1* | 5/2008 | Ahern et al. | 382/115 |
| 2008/0178002 A1* | 7/2008 | Hirata et al. | 713/168 |
| 2008/0178008 A1* | 7/2008 | Takahashi et al. | 713/186 |
| 2008/0222426 A1* | 9/2008 | Schrijen et al. | 713/186 |
| 2008/0273770 A1* | 11/2008 | Kohout | 382/125 |
| 2008/0298642 A1* | 12/2008 | Meenen | 382/115 |
| 2009/0006855 A1* | 1/2009 | Tuyls et al. | 713/182 |
| 2009/0007257 A1* | 1/2009 | Hirata et al. | 726/19 |
| 2009/0034805 A1* | 2/2009 | Perlmutter et al. | 382/118 |
| 2009/0070076 A1* | 3/2009 | Hirata et al. | 726/5 |
| 2009/0226053 A1* | 9/2009 | Matsuda et al. | 382/125 |
| 2009/0310830 A1* | 12/2009 | Bolle et al. | 382/124 |
| 2010/0040265 A1* | 2/2010 | Iizuka | 382/128 |

OTHER PUBLICATIONS

Ratha, N. K. et al., "Enhancing security and privacy in biometrics-based authentication systems", *IBM Systems Journal*, vol. 40, No. 3, pp. 614-634, 2001.

Hirata, S. et al., "Vulnerability Analysis and Improvement of Cancelable Biometrics for Image Matching", *Symposium on Cryptography and Information Security 2007*, Preliminary Papers, pp. 1-6, 2007 (with partial translation).

Han, J. and Kamber, M., "Data Mining", Morgan Kaufmann Publishers, pp. 348-353, 2001.

Miura, N. et al., "Feature extraction of finger-vein patterns based on repeated line tracking and its application to personal identification", *Machine Vision and Applications*, vol. 15, pp. 194-203, 2004.

Indyk, P. and Motwani, R., "Approximate Nearest Neighbors: Towards Removing the Curse of Dimensionality", *Proc. of the Symposium on Theory of Computing*, pp. 604-613, 1998.

Vidal Ruiz, E., "An algorithm for finding nearest neighbors in (approximately) constant average time", *Pattern Recognition Letters*, vol. 4, pp. 145-157, 1986.

Datar, M. et al., "Locality-Sensitive Hashing Scheme Based on p-Stable Distributions", *Proc. of the ACM Symposium on Computational Geometry*, pp. 253-262, 2004.

* cited by examiner

BIOMETRICS AUTHENTICATION METHOD AND CLIENT TERMINAL AND AUTHENTICATION SERVER USED FOR BIOMETRICS AUTHENTICATION

INCORPORATION BY REFERENCE

This application claims priority based on a Japanese patent application, No. 209-138778 filed on Jun. 10, 2009, the entire contents of which are incorporated herein by reference.

BACKGROUND OF THE INVENTION

The subject discussed herein relates to a biometrics authentication method for authenticating an individual by using personal biometric information.

In an individual authentication system using biometric information, the biometric information of an individual is acquired at the time of initial registration and information called feature is extracted and registered. The feature registered is termed a template. During authentication, the biometric information is again captured from the individual to extract the feature which in turn is collated with the precedently registered template to confirm whether or not the individual is the person in question. When, in a system having a client unit (simply referred to as a client) and a server unit (simply referred to as a server) coupled together through a network, the server carries out biometrics authentication of a user being present on the client side, the server holds a template typically. The client acquires biometric information the user, extracts a feature to transmit it to the server and the server collates the feature with the template to confirm whether or not the user is the person in question.

The template is however, effective information to identify an individual and is thereof required to be managed stringently as personal information, incurring high costs of management.

Further, even if the information is placed in stringent management, many persons having their privacy in mind will psychologically be reluctant to resister the template. In addition, the biometric information remains unchanged through life and cannot be changed easily in contrast to the password and the encrypted key. Conceivably, the biometric information may be exchanged for different one but the number of pieces of biometric information of one kind a single individual has is limited (for example, the number of fingerprints is limited to the number of fingers), failing to provide essential solving measures. Accordingly, in case the template is leaked facing a risk of forgery, their arises a problem that the biometrics authentication cannot be used safely ever since. Furthermore, if the same biometric information is registered in a different system, even the different system will be exposed to the menace.

Under the circumstances, a method as described in "Enhancing security and privacy in biometric-based authentication systems by N. K. Ratha, J. H. Connell and R. M. Bolle, IBM system Journal 40(3), 2001 (reference 1) has been proposed, according to which during registration of biometric information, a feature is transformed with the help of a particular function (a kind of encryption) and a secret parameter (a kind of encrypted key) the client has and the original information is taken in custody as a template by the server while being kept to be concealed and during authentication, a feature of biometric information newly extracted by the client is transformed with the same function and parameter as those above and transmitted to the server, and the server collates the received feature with the template while keeping them transformed (termed cancelable biometrics authentication).

According to the above method, the client keeps the transform parameter secret and so the server cannot know the original feature even during authentication and the privacy of individual can be protected.

Further, even if the template is leaked, the security can be assured by changing the transform parameter, preparing a template again and registering it. In addition, when the same biometric information is used for a different system, templates transformed with the help of different parameters, respectively, are registered so that even with one template leaked, the security of the different system can be prevented from being degraded.

SUMMARY

According to the aforementioned reference 1, the client transforms a feature image extracted from biometric information of a user with the help of a transform parameter P to prepare a transformed feature T and registers it in the server. The transform parameter P is saved in a Smart card, for example, to enable the user to manage it in secret.

During authentication, a feature image y the client newly extracts from the user's biometric information is transformed with the transform parameter P read out the user's Smart card to prepare a transformed feature V which in turn is transmitted the server. The server calculates the degree of similarity (hereinafter simply referred to as similarity) between the T and the V to decide match/mismatch.

In this manner, by transmitting to the server the T and V obtained by transforming the x and y with the secret transform parameter P, the server can be allowed to execute the matching process while x and y are concealed from the server.

Incidentally, when applying the cancelable biometrics authentication a system in which biometric information is inputted (without inputting any user ID) and a user ID is outputted (hereinafter referred to as 1:N authentication), matching with all transformed features T's in a DB of the server simply needs to be executed. But in the case of a large-scale DB, for matching with all T's, time to process the matching with all of the T's is prolonged in general, making the system unpractical disadvantageously.

To cope with this problem, a biometrics authentication technology is disclosed in which when applying cancelable biometrics authentication to an 1:N authentication system, the time required for the server to execute the 1:N matching can be shortened to speed up the process.

As an example is disclosed, in a method of registering biometric information based on a biometrics authentication method for authenticating an individual without using an ID of the individual but with the use of biometric information in a system including a client and a server, dummy features respectively representing groups each constituted by similar features are set in advance, the client performs a rough process for specifying, on the basis of a dummy feature, a group to which a feature for registration should belong and the server performs a process for registering a transformed feature or registration on the specified group.

As another example is disclosed, in a method of authenticating biometric information based on a biometrics authentication method for authenticating an individual without using an ID of the individual but with the use of biometric information in a system including a client and a server, dummy features respectively representing groups each constituted by similar features are set in advance, the client performs an rough process for specifying, on the basis of a dummy feature, a group to which a feature for authentication should belong and the server performs a detailed process for specifying any one of similar features in respect of the specified group.

Further, the feature is a transformed feature obtained by transforming biometric information extracted from an individual with the help of a predetermined parameter.

As a more specified example of method for biometrics authentication disclosed, in a method for biometrics authentication in which a client terminal transforms a feature for authentication extracted from biometric information of an individual with a transform parameter obtain a transformed feature for authentication and transmits it to an authentication server and the authentication server includes a database adapted to store a plurality of transformed features for registration and information specifying individuals by making the correspondence between them and searches the database to specify an individual corresponding to a transformed feature for registration which is the most similar to the transformed feature for authentication, the client terminal stores precedently in the database on the client side dummy features on the basis of which the features for registration and the features for authentication of the biometric information are classified into any of a plurality of groups, an index for identifying a group and transform parameters corresponding to the respective dummy features;

the authentication server includes a database of transformed features for registration adapted to store the transformed features for registration transformed from the features for registration with the help of transform parameters and information for specifying the individual from which extraction of the features for registration originates while classifying them into any of the plural groups; and for the process during registration of the biometric information, the client terminal comprises the steps of:

extracting a feature for registration from biometric information acquired from an individual;

searching the database on the client side specify one dummy feature for registration similar to the feature for registration;

transforming the feature for registration by using a transform parameter corresponding to the specified dummy feature for registration to prepare a transformed feature for registration; and transmitting to the authentication server the transformed feature for registration, an index for registration adapted to identify the specified group of dummy features for registration and information for specifying the individual from which the extraction of features for registration originates, and the authentication server comprises the step of:

registering, at a group corresponding to the index for registration in the database for transformed features for registration, the received transformed feature for registration and the information specifying the individual while making the correspondence between them.

As furthermore specified example of method for biometrics authentication disclosed, the client terminal includes the steps of:

extracting a feature for authentication from biometric information acquired from a individual;

searching a database on the client side to specify one dummy feature for authentication similar to the feature for authentication;

transforming the feature for authentication by using a transform parameter corresponding to the specified dummy feature for authentication to prepare a transformed feature for authentication; and transmitting to the authentication server the transformed feature for authentication and the index for authentication adapted to identify a group of specified dummy features for authentication, and the authentication server includes the steps of:

searching a group corresponding to the index for authentication in the database for transformed feature for registration to specify a transformed feature for registration which is the most similar the transformed feature for authentication;

specifying the individual having the correspondence with the specified transformed feature for registration; and transmitting to the client terminal the information concerning the specified individual.

According to the above examples, in the 1:N biometrics authentication system inputting the biometric information and outputting the user ID, time required for 1:N matching on the server side can be shortened and speedup of the processing can be achieved.

According to the examples of disclosure, a 1:N biometrics authentication system capable of executing high-speed authentication while keeping the user's biometric information concealed can be realized.

These and other benefits are described throughout the present specification. A further understanding of the nature and advantages of the realized by reference to the remaining portions of the specification and the attached drawings.

DESCRIPTION OF THE EMBODIMENTS

An embodiment of the biometrics authentication system will now be described with reference to the accompanying drawings.

The present embodiment will be described by way of example of a 1:N cancelable biometrics authentication system in which a cancelable biometrics authentication is applied to a 1:N authentication.

Figure 1:
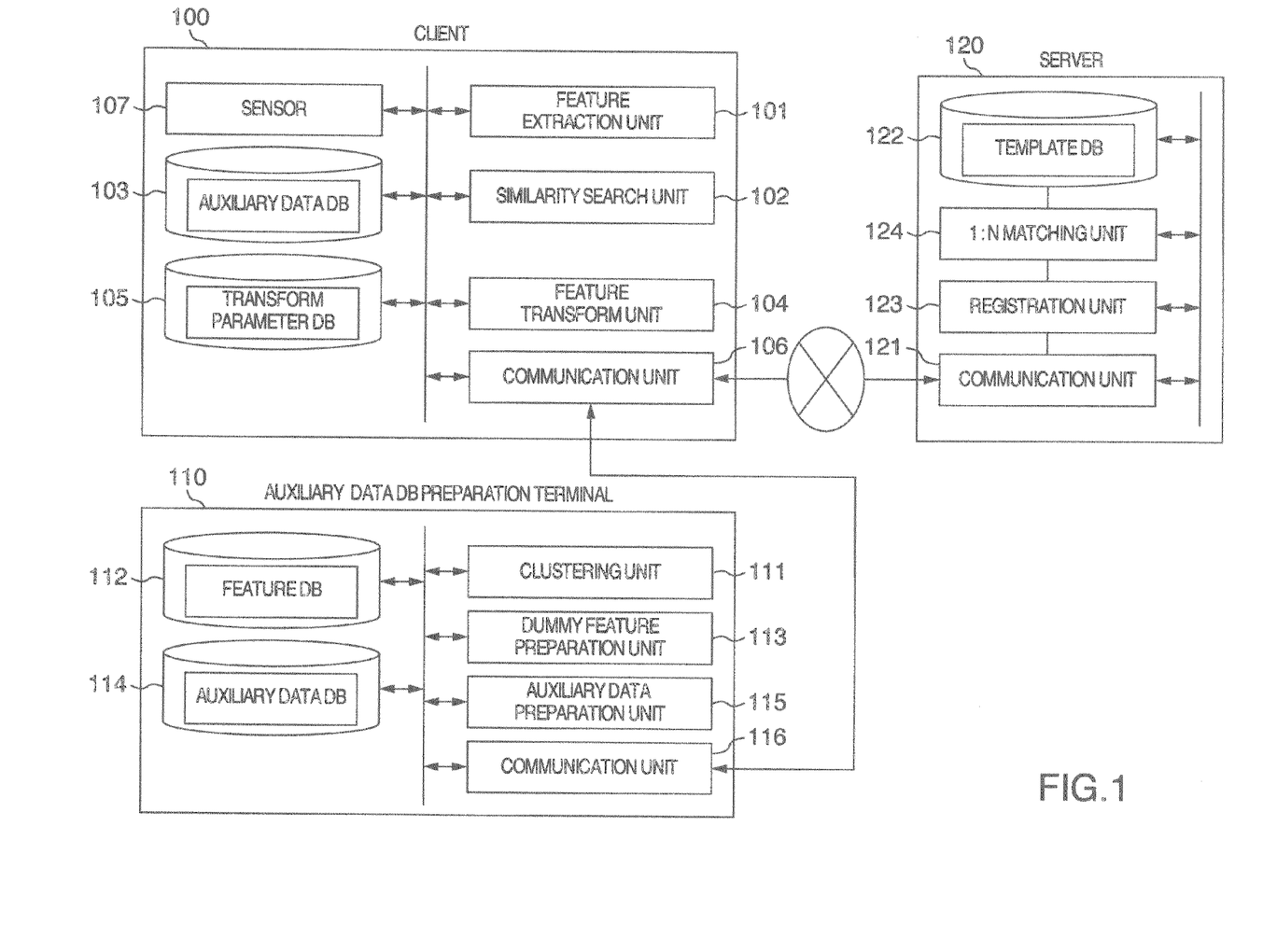
FIG. 1 is a block diagram exemplifying the functional construction of an embodiment.

Referring first to FIG. 1, a 1:N cancelable biometrics authentication system is constructed as shown therein in block diagram form.

In the present embodiment, the 1:N cancelable biometrics authentication system comprises a client terminal (hereinafter simply referred to as a client) 100 for performing acquisition of biometric information, extraction of feature, similarity search to a dummy feature and transformation of the features during registration/authenticating, an auxiliary data DB preparation terminal 110 for preparing a DB of auxiliary data inclusive of the dummy feature and an authentication server (hereinafter simply referred to as a server) 120 for storing templates and performing 1:N matching. These components are coupled to one another through a network such as Internet or Intranet.

The client 100 includes sensor 107 managed by a user on his or her own or by a reliable third party and adapted to acquire biometric information (for example, fingerprints or veins). Taking credit settlement in a retail shop, for instance, the client 100 may structurally be a credit terminal managed by the shop and the server 120 may be a server machine managed by a credit service company.

Then, the client 100 includes a feature extraction unit 101 which extracts a feature from the biometric information captured by the sensor 101, an auxiliary data DB 103 in which plurality of dummy features are stored in advance, a similarity search unit 102 which performs similarity search to dummy features in the auxiliary data DB 103, a transform parameter DB 105 which stores transform parameters corresponding to respective dummy features, a feature transform unit 104 which transforms a feature for registration or authentication so as to prepare a transformed feature for registration (hereinafter referred to as a template) or a transformed feature for authentication, and a communication unit 106 which communicates with the server.

The biometric information referred to herein is data indicative of, for example, a fingerprint image, a vein image and an iris image and the feature includes an image of, for example, a fingerprint or vein which undergoes an emphasis process for binary digitization or it includes a bit string called an iris code prepared from the iris image. Available as the similarity between the two features is that calculated through, for example, cross-correlation. Then, known as the matching algorithm for calculation of similarity on the basis the cross-correlation is an algorithm which applies a special transformation to the two features in order to calculate a similarity while keeping the original features concealed and keeping them unrecoverable to their original forms (correlation invariant random filtering). Details of the correlation invariant random filtering are disclosed in JP-A-2007-293807 reference 2) and "Vulnerability Analysis and Improvement of Cancelable Biometrics for Image Matching" by Hirata et al, SCIS2007 Preliminary Papers CD-ROM (reference 3).

The auxiliary data DB preparation terminal 110 includes a feature DB 112 representing a DB of features from which preparation of dummy features originates, a clustering unit 111 which applies clustering to a set of features in the feature DB, a dummy feature preparation unit 113 which prepares dummy features by making use of the results of clustering, an auxiliary data preparation unit 115 which prepares auxiliary data used for performing similarity search to the dummy feature in the client, an auxiliary data DB 114 which stores auxiliary data and a communication unit 116 which communicates with the client 100.

The server 120 includes a communication unit 121 which communicates with the client 100, database 122 for management of templates (template DB. The database will hereinafter be abbreviated as DB), a registration unit 123 which registers in the template DB 122 a template received from the client, and a 1:N matching unit 124 which collates a transformed feature received from the client with a plurality of templates in the template DB 122.

Figure 6:
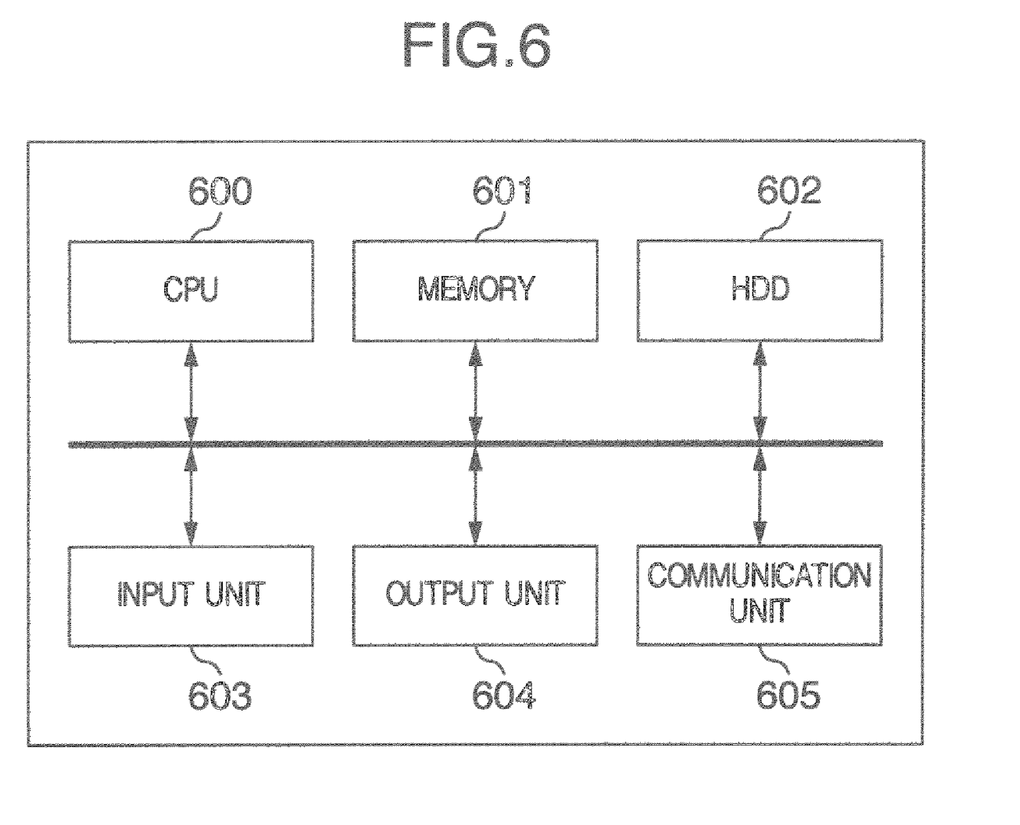
FIG. 6 is a block diagram exemplifying the hardware construction in the embodiment.

Illustrated in FIG. 6 is the hardware construction of the client 100 and server 120 in the present embodiment. These components can each be constituted of a CPU 600, a memory 601, a HDD 602, an input unit 603, an output unit 604 and a communication unit 605 as shown in the figure.

The functional construction of the client 100, auxiliary data DB preparation terminal 110 and server 120 and individual processes to be described later as well can be materialized when each corresponding CPU 600 executes respective programs stored in the memory 601 and the HDD 602. The respective programs may be stored in the corresponding memory 601 and HDD 602 or may be introduced, as necessary, from a different unit by way of a mountable/dismountable memory medium utilizable by the unit, a communication network representing a communication medium or a carrier wave or a digital signal propagating on the communication network.

Figure 2:
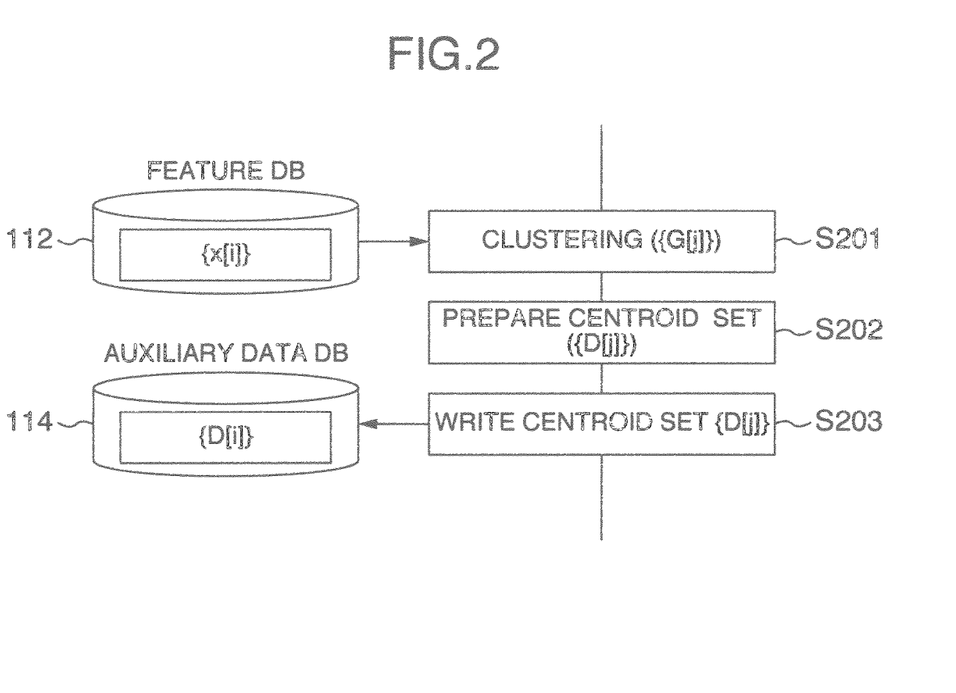
FIG. 2 is a flowchart exemplifying a dummy feature preparation process in the embodiment.

Next, by making reference to FIG. 2, a flow of a process for preparation of a dummy feature in the present embodiment will be described. Exemplified herein is method using a centroid as described in "Data Mining" by Jiawei Han and Micheline Kamber, published by Morgan Kaufmann Publishers, pp. 348 to 353, 2001 (reference 4). The dummy feature can be prepared through a method other than the above.

In the phase of system development, biometric information is collected in advance from an interested person such as a developer to prepare a set $\{x[i]\}$ of features which in turn is stored in the feature DB 112. For example, if the biometric information is a finger vein image, a method for feature extraction described in "Feature extraction of finger-vein patterns based on repeated line tracking and its application to personal identification" by N. Miura, A. Nagasaka and T. Miyatake, Machine Vision and Applications 15(4) (2004), 194-203 (reference 5) can be used.

The clustering unit 111 reads the set $\{x[i]\}$ of features to execute clustering (S201). Through clustering, features similar to one another are grouped. For details of the clustering, one may refer to reference 4. Where a set of groups of features is represented by $\{G[j]\}$, features $x[j, k]$ are included in the $G[j]$. In these expressions, i an index for a feature in the feature DB 112, j is an index for the group of clustered/resembling features and k is an index for a feature contained in the group j.

As a specific method for clustering, a k-means method, for example, can be used. The k-means method will be outlined here. The k-means method is a typical process for non-hierarchal cluster analysis and typically it presupposes the Euclidean space. In the method, the number of clusters is designated in advance (here k) and objects are divided into k classes. The non-similarity is defined by the square of a Euclidean distance and the criteria of classification is the non-similarity between the center of a cluster and each object. The k-means method can designate the number of clusters and hence it is meritorious in that a bias in the number of objects among individual clusters can be mitigated. Algorithm of the k-means method is as follows:

in step 1 [for initial value], centers or initial divisions of k clusters are given at random;

in step 2 [for allotment], each object is allotted to the closest cluster center; and in step 3 [for update of center], the program ends if allotments of all objects remain unchanged from those in the one preceding step. If not so, the centroid of each cluster is exchanged for a new center and the program returns to step 2.

In the program, respective coordinates at the center of a cluster are represented by a weighted means of coordinate values of objects contained in the cluster and respective coordinate values of the centroid in the cluster are represented by an average devoid of weighing.

The dummy feature preparation unit 113 prepares centroids $D[j]$ in respect of the individual groups $G[j]$ (S 202). The centroid signifies a feature indicative of the barycenter of features contained in the group. For more information, reference is to be made to reference 4. A set of centroids $\{D[j]\}$ thus prepared is written as a set of dummy features $\{D[i]\}$ into the auxiliary data DB 114 (S203).

Next, a method for preparation of the transform parameter DB 105 in the present embodiment will be described. Here, transform parameters are individually prepared and made to correspond to the individual dummy features D[i]. A transform parameter corresponding to a dummy feature D[i] is represented by an R[i]. As for a method for preparation of the transform parameter R[i], the method described in reference 2 or 3 can be used in the case of a finger vein image, for instance. Specifically, it is sufficient that a two-dimensional random filter in which values of individual pixels are random numbers is prepared. The random numbers can be generated using a pseudo-random number generator, for example. This random filter is used to provide the transform parameters R[i].

As an example, Locality-Sensitive Hashing (hereinafter termed LSH) described in "Approximate nearest neighbors towards removing the curse of dimensionality" by P. Indy k and R. Motwani, Proc. of the Symposium on Theory of Computing, 1988 (reference 6) is used for the method of performing similarity search to dummy feature in the present embodiment. Another method may be used for similarity search. For example, "Approximating and Eliminating Search Algorithm" (hereinafter termed AESA) described in "An algorithm for finding nearest neighbours in (approximately) constant average time" by Vidal Ruiz, Pattern Recognition Letters, pp. 145-157, 1986 (reference 7) may be available.

In the LSH, a hash table is necessary. By making reference to FIG. 3, a method of preparing a hash table will be described.

Figure 3:
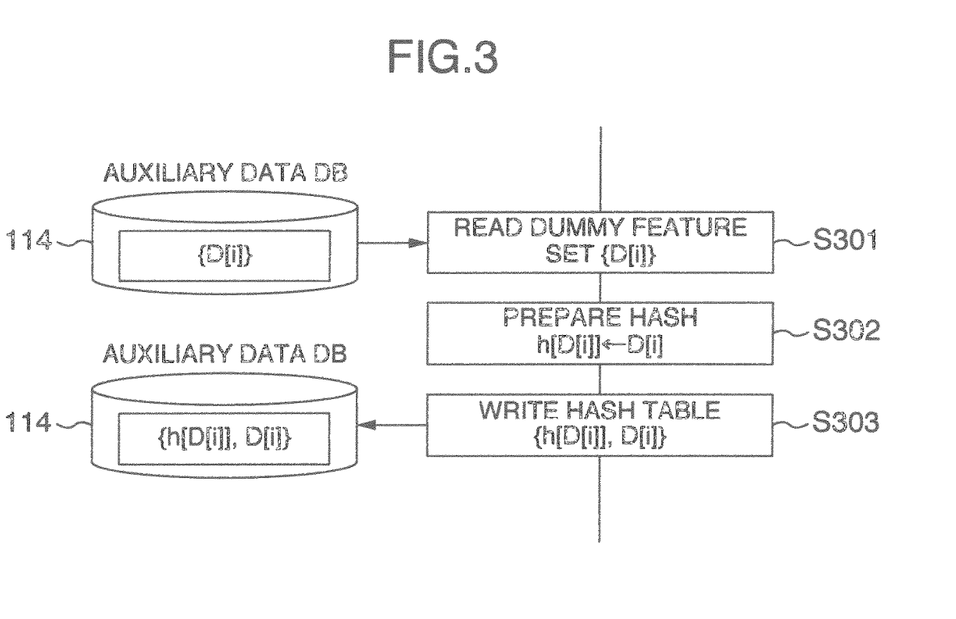
FIG. 3 is a flowchart exemplifying a process for preparing a hash table of dummy features in the embodiment.

The auxiliary data preparation unit 115 reads a dummy feature set {D[i]} stored in the auxiliary DB 114 (S301).

The auxiliary data or preparation unit 115 prepares a hash table (S302). Here, a method described in "Locality-sensitive hashing scheme based on p-stable distributions" by M. Datar, N. Immorlica, P. Indyk and V. Mirrokni, Proc. of the ACM Symposium on Computational Geometry, 2004 (reference 8) is used exemplarily. Another method may be available. In reference 8, the hash is prepared pursuant to the following equation in relation to a feature vector v.

$$h_{a,b}(v) = \text{INT}((a \cdot v + b)/r) \qquad \text{equation (1)}$$

where the element of vector a has a value extracted randomly from p-stable distributions typified by the Gaussian distribution, the scalar b has a value extracted randomly from the range of [0,r] in accordance with a uniform distribution and the function "INT( )" signifies round-off of decimal.

To add, the hash function used in the LSH is called a hash function sensitive to locality (hereinafter, termed a locally sensitive hash function) and is defined as will be described below. Where an object original space is S and a space of generated hash values is U, a locally sensitive hash set is defined when a hash function set H={h:S->U} satisfies conditions as below.
(a) If a point v is distant from a point q within a radius $r_1$, the probability that a hash value of v collides with that of q is $p_1$ or more, and
(b) If the point v is not distant from the point q within a radius $r_2$ (=$cr_1$), the probability that a hash value of v collides with that of q is $p_2$ ($p_2 < p_1$) or less.

By using equation (1), a hash h[D[i]] of a dummy feature D[i] is prepared. The hash table is prepared as a table having an element (h[D[i]], D[i]). The similarity search using the LSH will be described later.

The thus prepared hash table is stored in the auxiliary data DB 114.

Then, the auxiliary data DB preparation terminal transmits to the client the data in the auxiliary data DB 114. Receiving the data, the client stores the data in the auxiliary data DB 103.

Figure 4:
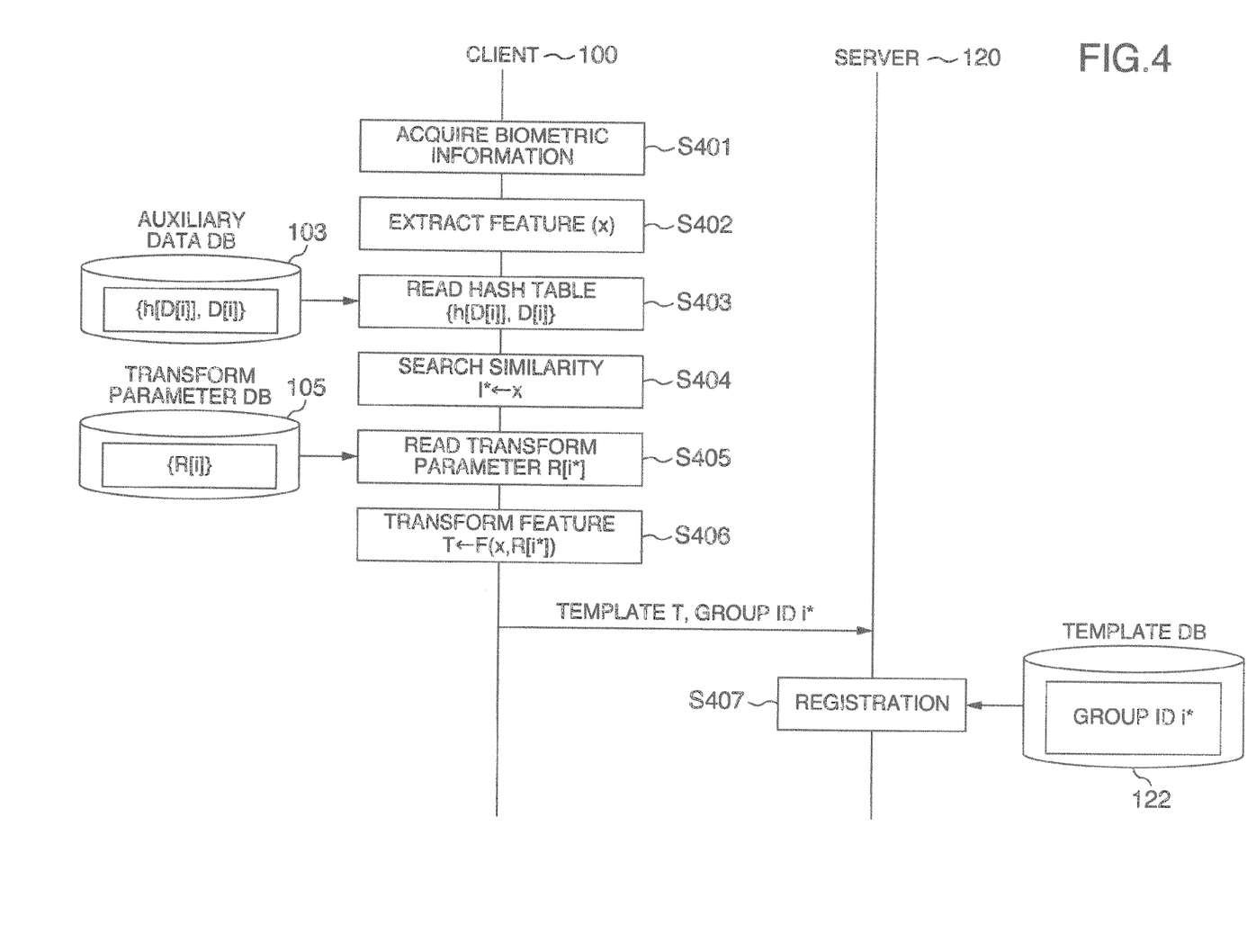
FIG. 4 is flowchart exemplifying registration process in the embodiment.

Next, a flow of registration process in the present embodiment will be described with reference to FIG. 4.

The sensor 107 captures biometric information of a user (S401).

The feature extraction unit 101 extracts a feature x from the biometric information (S402). If a finger vein image is concerned, the method described in reference 5 can be used as feature extraction method.

The similarity search unit 102 reads the hash table {h[D[i]], D[i]} from the auxiliary data DB 103 (S403).

The similarity search on 102 searches the read-in hash table {h[D[i]], D[i]} and specifies a dummy feature resembling a feature x (S404). Here, as an example, the method called LSH described in references 6 and 8 is supposed to be used. Another method, for example, the AESA described in reference 7 may be used.

Firstly, by using equation (1), a hash value h[x] of the feature x is calculated. Subsequently, with respect to a set of hashes {h[D[i]]} in the read-in hash table {h[D[i]],D[i]}, a dummy feature coincident with the hash h[x] is searched. Generally, the dummy feature D[i] having the coincident hash value is one or more in number. These dummy features are called hash matched dummy features D*[i]. In the presence of a plurality of these hash matched dummy features, each hash matched dummy feature D*[i] is collated with a feature x. For matching, a method using cross-correlation, for example, may be used. A hash matched dummy feature having the maximal cross-correlation is determined as a dummy feature which is the most similar to the feature x. This is called the nearest neighboring dummy feature D*[i*]. The result of the similarity search is the index i* for the nearest neighboring dummy feature D*[i*].

The feature transform unit 104 reads a transform parameter R[i*] corresponding to the nearest neighboring dummy feature D*[i] (S405).

The feature transform unit 104 transforms the feature x by using the transform parameter R[i*] (S406). In finger vein biometrics authentication, for example, the similarity between two features may sometimes be calculated through cross-correlation. For matching algorithm in which the similarity is calculated on the basis the cross-correlation, an algorithm (correlation invariant random filtering) is known in which the similarity is calculated by applying a special transformation to the two features to keep them concealed and keep them unreturned (for details, see references 2 and 3). In this case, transform parameters R[i*] are given by random filter having individual pixel values in the form of random numbers. In the transformation process, the feature x first undergoes change of bases (such as number-theoretic transform or Fourier transform) and (data after the change of bases) is designated by X, and thereafter the X is multiplied by the random filter pixel-wise. The above is a typical example of transformation process but another method may be employed.

The feature T after transformation is used as a template T and an index i* for the nearest neighboring dummy feature D*[i*] is used for a group ID. Then, the template T and the group IDi* are transmitted to the server 220.

The server 120 registers the template T at a group having i* as ID in the template DB 122 (S407).

Figure 5:
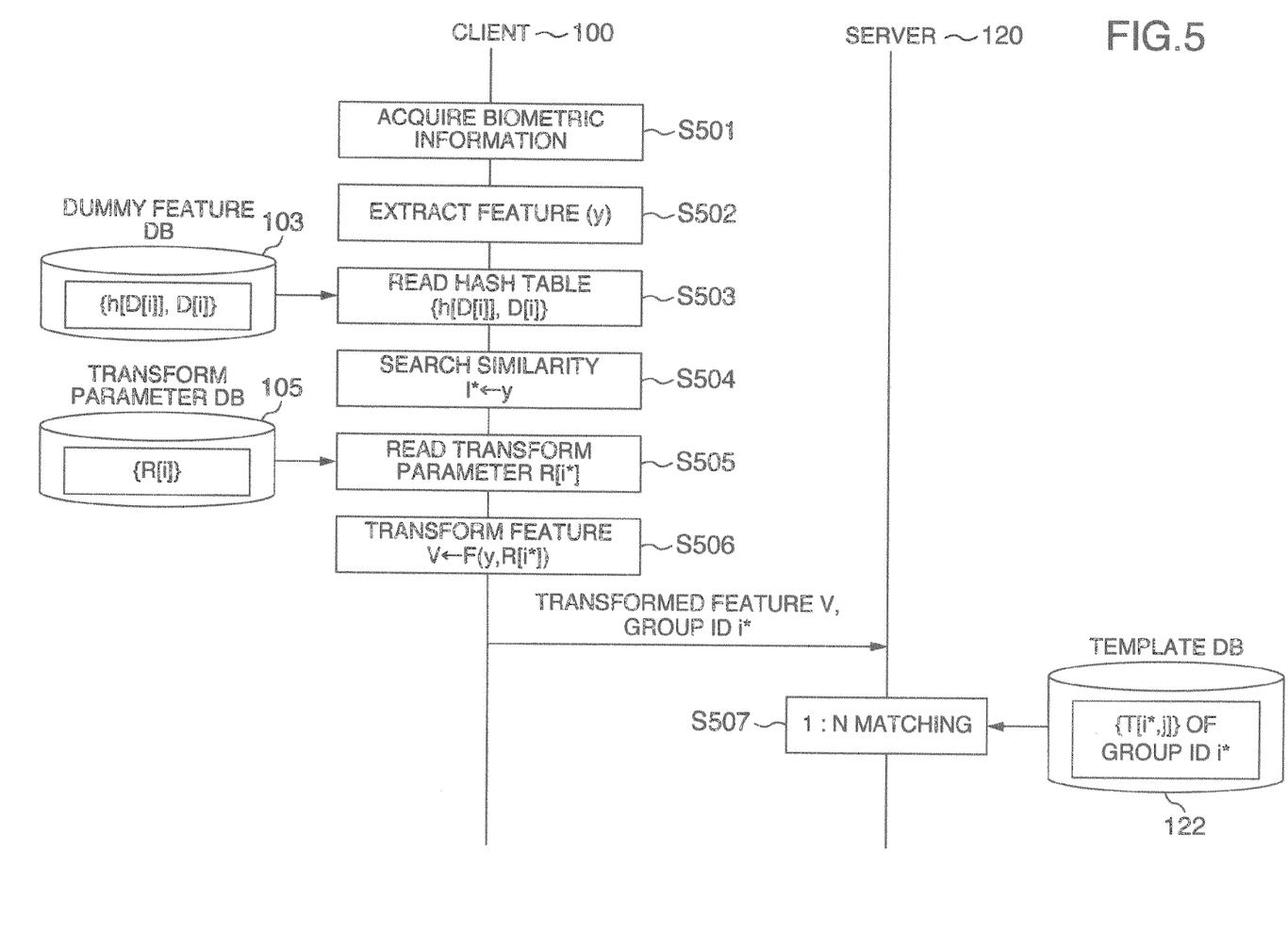
FIG. 5 is a flowchart exemplifying a 1:N authentication process in the embodiment.

Next, 1:N authentication process in the present embodiment will be described with reference to FIG. 5. The sensor 107 captures biometric information of the user (S501).

The feature extraction unit 101 extracts a feature y from the biometric information (502). As a method for feature extraction, the method described in reference 5 can be used in the case of, for example, a finger vein image.

The similarity search unit 102 reads the hash table {h[D[i]], D[i]} from the auxiliary data DB 103 (S503).

The similarity search unit 102 searches the read hash table {h[D[i]], D[i]} and specifies a dummy feature resembling a feature y (S504). Here, as an example, the method called LSH described in references 3 and 6 is supposed to be used but another method may be adoptable. For example, the AESA described in reference 7 may be used.

Firstly, by using equation (1), a hash value h[y] of the feature y is calculated. Subsequently, with respect to a set of hashes {h[D[i]]} in the read-in hash table {h[D[i]],D[i]}, a dummy feature coincident with the hash h[y] is searched. Generally, one or more dummy features D [i] having the coincident hash value may be present. These dummy features are called hash matched dummy features D*[i]. In the presence of a plurality of these hash matched dummy features, each hash matched dummy feature D*[i] is collated with the feature y. For matching, a method using cross-correlation, for example, may be used. A hash matched dummy feature having the maximal cross-correlation is determined as a dummy feature which is the most similar to the feature y. This is called the nearest neighboring dummy feature D*[i*]. The result of the similarity search is the index i* for the nearest neighboring dummy quantity D*[i*].

The feature transform unit 104 reads transform parameter R[i*] corresponding to the nearest neighboring feature D*[i*] (S505).

The feature transform unit 104 transforms the feature y by using the transform parameter R[i*] (S506). In finger vein biometrics authentication, for example, the similarity between two features may sometimes be calculated through cross-correlation. For matching algorithm in which the similarity is calculated on the basis of the cross-correlation, an algorithm (correlation invariant random filtering) is known in which the similarity is calculated by applying a special transformation to the two features to keep them concealed and keep them unreturned (for details, refer to references 2 and 3). In this case, transform parameters R[i*] are given by a random filter having individual pixel values in the form of random numbers. In the transformation process, the feature y first undergoes change of bases (such as number-theoretic transform Fourier transform) and (data after the change of bases) is designated by Y, and thereafter the Y is divided by the random filter pixel-wise. The above is a typical example of transformation process but another method may be employed.

An index i* for the nearest neighboring dummy feature D*[i*] is used as a group ID. Then, the transformed feature Y and the group IDi* are transmitted to the server 120.

The server 120 performs a 1:N matching between the transformed feature V and templates contained at a group having i* as ID in the template DB 122 (S507). In finger vein biometrics authentication, for example, the similarity between two features may sometimes be calculated through cross-correlation. For matching algorithm in which the similarity is calculated on the basis of the cross-correlation, an algorithm (correlation invariant random filtering) is known in which the similarity is calculated by applying a special transformation to the two features to keep them concealed and keep them unreturned (for details, see references 2 and 3). In this case, transform parameters are common in the group i* and therefore, the 1:N matching can be realized in such way that 1:1 matching between each of the templates inside the group i* and the transformed feature V is executed once and an ID for a template having the highest correlation is outputted as the result.

According to the present embodiment, during authentication, allotment to a particular group executed by performing similarity search to the dummy feature on the side of client 100, so that the number of templates subject to 1:N matching on the side of the server 120 is allowed to narrow down drastically, thereby ensuring that the load processed on the server side can be educed and the time to process the 1:N matching can be decreased to great extent.

As has been set forth so far, according to the present embodiment, in the 1:N authentication, the load on the server side can be reduced and speedup of the process can be achieved. Besides, since not only features of biometric information belonging to a specified individual but also dummy features are held in the client 100, problems of privacy and security do not matter.

The foregoing embodiment can be applicable to an arbitrary application in which user authentication the basis of biometric information.

For example, widespread application can be attained to, for example, information access control in an internal office network, personal confirmation in internet banking system or ATM, log-in to a Web site toward members, personal authentication during entrance to a protective area, log-in in personal computers, and so on.

The specification and drawings are, accordingly, to be regarded in an illustrative rather that a restrictive sense. It will, however, be evident that various modifications and changes may be made thereto without departing from the spirit and scope of the invention as set forth in the claims.

The invention claimed is:

1. A biometrics authentication method in which
a client terminal, comprising at least one computer, is configured to transform a feature for authentication extracted from biometric information of an individual with the help of a transform parameter to obtain a transformed feature for authentication and to transmit it to an authentication server,
the authentication server includes a database adapted to store a plurality of transformed features for registration and information specifying the individual by making the correspondence between them and searches said database to specify an individual corresponding to a transformed feature for registration which is the most similar to the transformed feature for authentication,
said client terminal is configured to store in a database on the client side in advance dummy features on basis of which the feature for registration and the feature for authentication of the biometric information are classified into any of a plurality of groups, an index for identifying the group and transform parameters corresponding to the respective dummy features; and
said authentication server includes a database for transformed features for registration adapted to store the transformed feature for registration transformed from the feature for registration with help of the transform parameter and information for identifying the individual from which extraction of the feature for registration originates while classifying them into any of said plural groups on the basis of said index,
wherein, during a process for registration of the biometric information, said biometrics authentication method comprises in said client terminal the steps of:
extracting, via the at least one computer, a feature for registration from biometric information acquired from an individual;
searching, via the at least one computer, said database on the client side to specify one dummy feature for registration similar to the feature for registration;
transforming, via the at least one computer, the feature for registration by using a transform parameter corresponding to the specified dummy feature for registration and preparing a transformed feature for registration; and
transmitting, via the at least one computer, to said authentication server the transformed feature for registration, an index for registration adapted to specify a group of the specified dummy feature for registration and information for specifying the individual from which extraction of the feature for registration originates, said biometrics authentication method comprises in said authentication server the step of:

registering, via the at least one computer, at a group corresponding to said index for registration in said database for transformed feature for registration, the received transformed feature for registration and the information specifying the individual while making the correspondence between them; and wherein said plural features for registration extracted in advance are divided, via the at least one computer, into a plurality of groups pursuant to a predetermined criterion and a centroid calculated from features for registration contained in one group is set, via the at least one computer, as said dummy feature corresponding to said group.

2. A biometrics authentication method based on the biometric information registered in accordance with the method for registration of biometric information as recited in claim 1, said biometrics authentication method comprising in said client terminal during a process for authentication the steps of:

extracting, via the at least one computer, a feature (y) for authentication from biometric information acquired from an individual;

searching, via the at least one computer, said database on the client side to specify one dummy feature for authentication similar to the feature for authentication; and transforming, via the at least one computer, the feature for authentication by using a transform parameter corresponding to the specified dummy feature for authentication and preparing a transformed feature for authentication; and transmitting, via the at least one computer, to said authentication server the transformed feature for authentication and an index for authentication adapted to identify a group of specified dummy features for authentication, and said biometrics authentication method comprising in said authentication server the steps of:

searching, via the at least one computer, a group corresponding to the index (i) for authentication in the database for transformed feature for registration to specify a transformed feature which is the most similar to the transformed feature for authentication; specifying the individual having the correspondence with the specified transformed feature for registration; and transmitting, via the at least one computer, to said client terminal the information concerning the specified individual.

3. A biometrics authentication method according to claim 2, wherein in specifying one dummy feature similar to the feature for registration and in specifying one dummy feature for authentication similar to the feature for authentication in said client terminal, Locality-Sensitive Hashing or Approximating and Eliminating Search Algorithm is used.

4. A client terminal, comprising at least one computer, used for biometrics authentication in which a transformed feature for registration obtained by transforming a feature for registration extracted from biometric information of an individual with the help of a transform parameter is transmitted via the at least one computer to an authentication server and registered therein, wherein a dummy feature based on which a feature for registration and a feature for authentication of biometric information are classified into any of a plurality of groups, an index for identifying said group, transform parameters corresponding to respective dummy features are memorized in a database on the client side;

the feature for registration is extracted, via the at least one computer, from biometric information acquired from an individual; said database on the client side is searched to specify one dummy feature for registration similar to the feature for registration;

a transformed feature for registration is prepared, via the at least one computer, by transforming the feature for registration by the use of the transform parameter corresponding to the specified dummy feature for registration; and the transformed feature for registration, the index for registration adapted to identify a group of the specified dummy feature for registration and information for specifying the individual from which extraction of the feature for registration originates are transmitted, via the at least one computer, to said authentication server; and wherein said plural features for registration extracted in advance are divided , via the at least one computer, into a plurality of groups pursuant to a predetermined criterion and a centroid calculated from features for registration contained in one group is set, via the at least one computer, as said dummy feature corresponding to said group.

5. A client terminal used for biometrics authentication according to claim 4, wherein a feature for authentication is extracted, via the at least one computer, from biometric information acquired from an individual;

said database on the client side is searched, via the at least one computer, to specify one dummy feature for authentication similar to the feature for authentication;

the specified feature for authentication is transformed, via the at least one computer, by using the transform parameter corresponding to the specified dummy feature for authentication to prepare a transformed feature for authentication;

the transformed feature for authentication and an index for authentication adapted to identify the specified group of dummy features for authentication are transmitted, via the at least one computer, to said authentication server; and information concerning the specified individual is received, via the at least one computer, from said authentication server.

6. A client terminal used for biometrics authentication according to claim 4, wherein in specifying one dummy feature for registration similar to the feature for registration, Locality-Sensitive Hashing or Approximating and Eliminating Search Algorithm is used.

* * * * *